United States Patent
Matsumura

(10) Patent No.: US 10,525,981 B2
(45) Date of Patent: *Jan. 7, 2020

(54) DRIVER CONDITION DETECTION SYSTEM

(71) Applicant: Toyota Jidosha Kabushiki Kaisha, Toyota-shi, Aichi-ken (JP)

(72) Inventor: Takeshi Matsumura, Numazu (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 36 days.

This patent is subject to a terminal disclaimer.

(21) Appl. No.: 15/870,485

(22) Filed: Jan. 12, 2018

(65) Prior Publication Data
US 2018/0201274 A1  Jul. 19, 2018

(30) Foreign Application Priority Data

Jan. 17, 2017 (JP) .................................. 2017-006120

(51) Int. Cl.
| | | |
|---|---|---|
| *B60W 50/14* | (2012.01) | |
| *B60W 40/09* | (2012.01) | |
| *G06K 9/00* | (2006.01) | |
| *B60W 40/08* | (2012.01) | |

(52) U.S. Cl.
CPC ............ *B60W 40/09* (2013.01); *B60W 50/14* (2013.01); *G06K 9/00845* (2013.01); *B60W 2040/0818* (2013.01)

(58) Field of Classification Search
CPC ................ B60W 40/09; B60W 50/14; B60W 2040/0818; B60W 40/08; B06K 9/00845; G06K 9/00281; G06K 9/00288; G06K 9/00268
See application file for complete search history.

(56) References Cited

U.S. PATENT DOCUMENTS

| | | | | |
|---|---|---|---|---|
| 5,859,921 A | * | 1/1999 | Suzuki | G06K 9/00268 382/118 |
| 2007/0192038 A1 | | 8/2007 | Kameyama | |
| 2008/0166052 A1 | | 7/2008 | Hatano | |
| 2012/0057749 A1 | | 3/2012 | Takahashi et al. | |
| 2014/0139655 A1 | | 5/2014 | Mimar | |
| 2016/0001781 A1 | * | 1/2016 | Fung | B60W 40/08 701/36 |
| 2016/0314366 A1 | | 10/2016 | Omi | |

(Continued)

FOREIGN PATENT DOCUMENTS

| | | |
|---|---|---|
| JP | 3093959 U | 5/2003 |
| JP | 2003308533 A | 10/2003 |

(Continued)

OTHER PUBLICATIONS

Ueno et al., Development of drowsiness detection system, 1994, IEEE, p. 15-20 (Year: 1994).*

(Continued)

*Primary Examiner* — McDieunel Marc
(74) *Attorney, Agent, or Firm* — Dinsmore & Shohl LLP

(57) ABSTRACT

The driver condition detection system comprises a driver monitor camera provided in a vehicle and capturing a driver of the vehicle to generate an image of the driver, and a driver condition judging part configured to judge a condition of the driver based on the image of the driver. The driver condition judging part is configured to judge that the driver is not in a condition able to drive if detecting the driver slumping against the steering wheel based on the image of the driver.

18 Claims, 8 Drawing Sheets

(56) References Cited

U.S. PATENT DOCUMENTS

| | | | |
|---|---|---|---|
| 2017/0140232 A1 | 5/2017 | Banno et al. | |
| 2017/0155867 A1 | 6/2017 | Yokota et al. | |
| 2018/0201276 A1* | 7/2018 | Matsumura | B60W 50/14 |
| 2019/0135295 A1* | 5/2019 | Sato | B60W 40/08 |

FOREIGN PATENT DOCUMENTS

| | | | |
|---|---|---|---|
| JP | 2008-037218 A | 2/2008 | |
| JP | 2009176112 A | 8/2009 | |
| JP | 2009294753 A | 12/2009 | |
| JP | 2011253547 A | 12/2011 | |
| JP | 201258769 A | 3/2012 | |
| JP | 201419301 A | 2/2014 | |
| JP | 201657839 A | 4/2016 | |
| WO | 2015198542 A1 | 12/2015 | |

OTHER PUBLICATIONS

Takahashi, Various perspectives for driver support systems in Japan, 2012, IEEE, p. 1627-1632 (Year: 2012).*

Shen et al., A Novel Sensors-Based and Multiple Warning Early Fatigue Detection System Architecture, 2015, IEEE, p. 193-196 (Year: 2015).*

Itoh et al., Drivers Status Monitor, 2005, IEEE, p. 1-8 (Year: 2005).*

Mizuno et al. Detecting driver's visual attention area by using vehicle-mounted device, 2017, IEEE, p. 346-352 (Year: 2017).*

Saito et al., Driver Assistance System With a Dual Control Scheme: Effectiveness of Identifying Driver Drowsiness and Preventing Lane Departure Accidents, 2016, IEEE, p. 660-671 (Year: 2016).*

Singh et al., Eye tracking based driver fatigue monitoring and warning, 2011, IEEE, p. 1-6 (Year: 2011).*

Fletcher et al., Vision in and out of vehicles, 2003, IEEE, p. 12-17 (Year: 2003).*

U.S. Appl. No. 15/891,455, filed Feb. 8, 2018; Inventor: Takeshi Matsumura.

Non-Final Office Action dated Jul. 25, 2019 in U.S. Appl. No. 15/891,455.

U.S. Appl. No. 15/870,497, filed Jan. 12, 2018; Inventor: Takeshi Matsumura.

Notice of Allowance dated Oct. 11, 2019 in U.S. Appl. No. 15/870,497, filed Jan. 12, 2018; Inventor: Takeshi Matsumura.

* cited by examiner

DRIVER CONDITION DETECTION SYSTEM

CROSS-REFERENCE TO RELATED APPLICATIONS

This application claims priority to Japanese Patent Application No. 2017-006120 filed on Jan. 17, 2017, the entire contents of which are hereby incorporated by reference.

TECHNICAL FIELD

The present disclosure relates to a driver condition detection system.

BACKGROUND ART

If sudden illness etc., causes the driver of a vehicle to become abnormal in condition, the driver cannot suitably operate the vehicle or monitor the vehicle. For this reason, monitoring the driver condition and detecting any abnormal condition in the driver so as to secure the host vehicle and other vehicles may be desirable in some instances.

In the past, several methods have been proposed for detecting an abnormal condition of the driver. For example, PLT 1 discloses detecting that the driver is not in a condition able to drive based on facial information of the driver detected after external force is applied to the vehicle while running (magnitude of amplitude of movement of head). Further, PLT 2 discloses detecting the driver condition based on facial information of the driver (line of sight information, blinking information, facial direction information, etc.), heartbeat information, breathing information, brainwave information, etc.

CITATION LIST

Patent Literature

PLT 1: WO2015/198542A
PLT 2: Japanese Patent Publication No. 2014-019301A

SUMMARY

Technical Problem

However, in the method of using the facial information of the driver, if the face of the driver has not yet been detected, an abnormal condition of the driver cannot be detected. Further, in order to detect heartbeat information, breathing information, or brainwave information of the driver, complicated and expensive equipment is necessary.

Therefore, an object of the present disclosure is to provide a driver condition detection system able to easily detect an abnormal condition of a driver even if the face of the driver has not yet been detected.

Solution to Problem

The summary of the present disclosure is as follows.

(1) A driver condition detection system comprising: a driver monitor camera provided in a vehicle and capturing a driver of the vehicle to generate an image of the driver and a driver condition judging part configured to judge a condition of the driver based on the image of the driver, wherein the driver condition judging part is configured to judge that the driver is not in a condition able to drive if detecting the driver slumping against the steering wheel based on the image of the driver.

(2) The driver condition detection system described in above (1), wherein the driver condition judging part is configured to detect slumping against the steering wheel if a contrast of the image of the driver is lower than a contrast of an image in the vehicle generated by the driver monitor camera when the driver is not in front of the driver monitor camera.

(3) The driver condition detection system described in above (2), wherein the driver condition judging part is configured to update the contrast of the image in the vehicle by an image capturing operation of the driver monitor camera before starting the detection of slumping.

(4) The driver condition detection system described in above (2) or (3), wherein the driver condition judging part is configured to judge that the contrast of the image of the driver is lower than the contrast of the image in the vehicle if a ratio of an area of a region where a luminance difference is a predetermined value or less is higher in the image of the driver than the image in the vehicle.

(5) The driver condition detection system described in any one of above (1) to (4), wherein the driver condition judging part is configured to detect slumping against the steering wheel if it cannot detect a face of the driver in the image of the driver and detects a horn button of the steering wheel being pressed.

(6) The driver condition detection system described in any one of above (1) to (5), further comprising a steering wheel touch sensor detecting the driver touching the steering wheel, wherein
the driver condition judging part is configured to detect slumping against the steering wheel if it cannot detect a face of the driver in the image of the driver and the steering wheel touch sensor detects the steering wheel being touched.

Advantageous Effects

According to some embodiments of the present disclosure, it is possible to detect an abnormal condition of a driver even if the face of the driver has not yet been detected.

DESCRIPTION OF EMBODIMENTS

Figure 1:
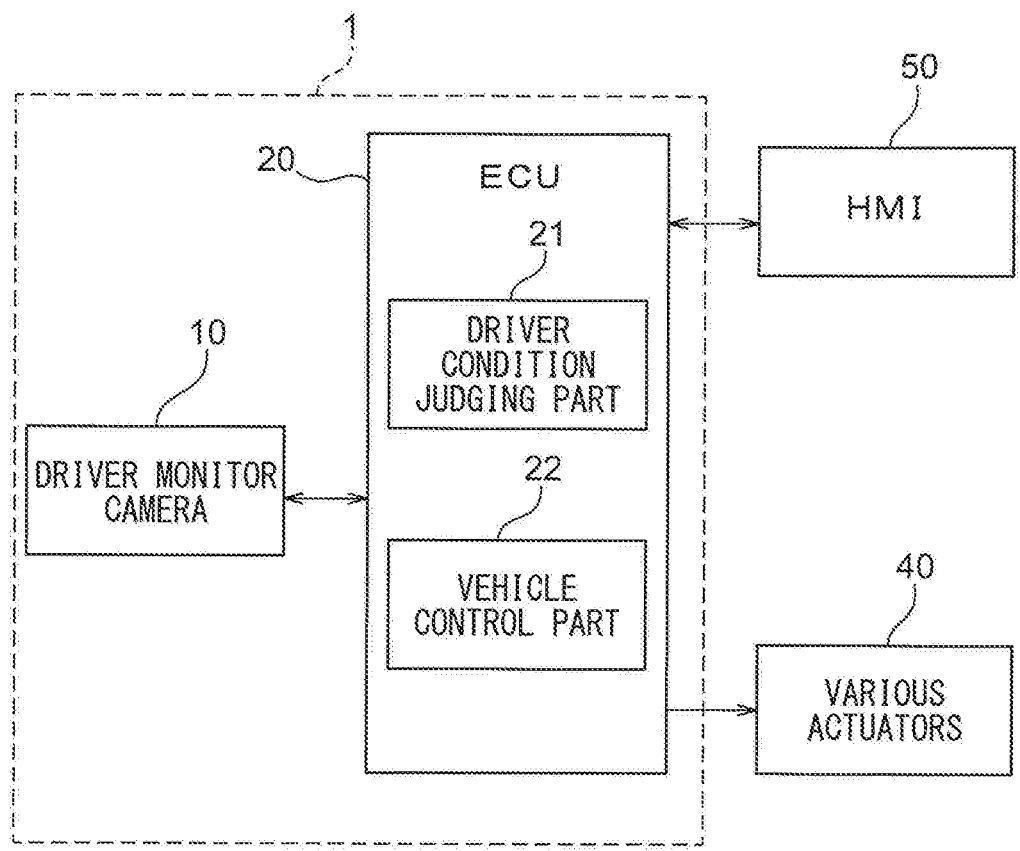
FIG. 1 is a block diagram showing the configuration of a driver condition detection system according to a first embodiment of the present disclosure.

Below, referring to the drawings, embodiments of the present disclosure will be explained in detail. Note that, in the following explanation, similar component elements will be assigned the same reference numerals.

First Embodiment

Below, referring to FIG. 1 to FIG. 5, a first embodiment of the present disclosure will be explained. FIG. 1 is a block diagram showing the configuration of a driver condition detection system according to a first embodiment of the present disclosure. The driver condition detection system 1 is mounted in a vehicle and detects the condition of the driver of the vehicle. The driver condition detection system 1 is provided with a driver monitor camera 10 and an electronic control unit (ECU) 20.

Figure 2:
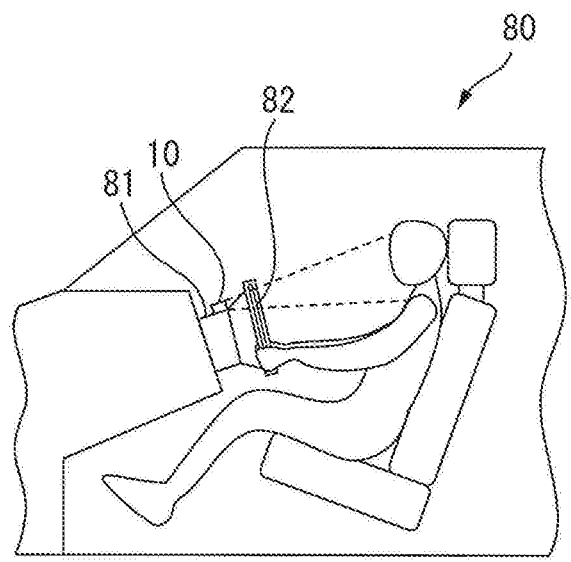
FIG. 2 is a view schematically showing the inside of a vehicle mounting the driver condition detection system.

FIG. 2 is a view schematically showing the inside of a vehicle mounting a driver condition detection system. The driver monitor camera 10 captures the driver of the vehicle 80 to generate an image of the driver. The driver monitor camera 10 is provided inside the vehicle. Specifically, as shown in FIG. 2, the driver monitor camera 10 is provided at the top of a steering wheel column 81 of the vehicle 80. FIG. 2 shows a range of projection of the driver monitor camera 10 by broken lines. Note that, the driver monitor camera 10 may be provided at the steering wheel 82, instrument panel, instrument panel hood, etc., of the vehicle 80.

The driver monitor camera 10 is comprised of a camera and projector. For example, the camera is a CMOS (complementary metal oxide semiconductor) camera or CCD (charge coupled device) camera, while the projector is an LED (light emitting diode). Further, in order to enable the face of the driver to be captured without making the driver uncomfortable even during other low luminance time such as night, etc., the projector is a near-infrared LED in some embodiments. For example, the projector is two near-infrared LEDs arranged at the two sides of the camera. Further, the camera may be provided with a filter such as a visible light cutting filter. The image of the driver generated by the driver monitor camera 10 is transmitted from the driver monitor camera 10 to the ECU 20.

The ECU 20 is a microcomputer provided with components connected with each other by bidirectional buses such as a central processing unit (CPU), read only memory (ROM), random access memory (RAM), input port, and output port. In the present embodiment, one ECU 20 is provided, but a plurality of ECUs may be provided for the different functions. The ECU 20 includes a driver condition judging part 21 judging the condition of the driver based on the image of the driver generated by the driver monitor camera 10, and a vehicle control part 22 controlling the various types of actuators 40 of the vehicle 80.

If sudden illness etc., causes the driver of the vehicle 80 to become abnormal in condition, the driver cannot suitably operate the vehicle 80 or monitor the vehicle. For this reason, some embodiments monitor the driver condition and detect any abnormal condition in the driver so as to secure the host vehicle and other vehicles. However, when the driver becomes abnormal in condition, sometimes the face of the driver cannot be detected from the image of the driver generated by the driver monitor camera 10. Further, in order to detect heartbeat information, breathing information, or brainwave information of the driver, complicated and expensive equipment is necessary. Therefore, in the present embodiment, the driver slumping against the steering wheel 82 is detected to detect an abnormal condition of the driver.

Specifically, the driver condition judging part 21 detects the driver slumping against the steering wheel 82 based on the image of the driver generated by the driver monitor camera 10 and, when detecting the driver slumping against the steering wheel 82, judges that the driver is not in a condition able to drive. Due to this, in the present embodiment, even if the face of the driver has never been detected, it is possible to easily detect an abnormal condition of the driver.

Figure 3:
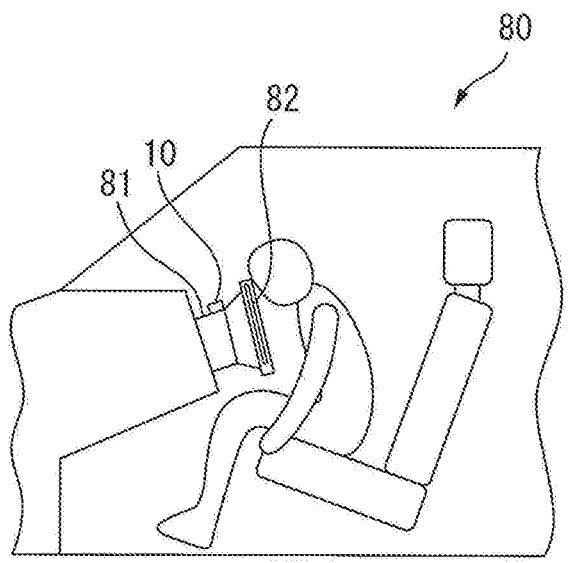
FIG. 3 is a view showing a driver slumping against a steering wheel.

The driver slumping against the steering wheel 82 is for example detected in the following way. As shown in FIG. 3, if the driver is slumped against the steering wheel 82, since the driver approaches the driver monitor camera 10, the contrast of the image of the driver generated by the driver monitor camera 10 falls. The contrast at this time is lower than the contrast of the image in the vehicle generated by the driver monitor camera 10 when the driver is not in front of the driver monitor camera 10. Further, the contrast of the image of the driver becomes higher than the above contrast of the image in the vehicle when the driver is in a normal operating stance. For this reason, the driver condition judging part 21 detects the driver slumping against the steering wheel 82 if the contrast of the image of the driver generated by the driver monitor camera 10 is lower than the above contrast of the image in the vehicle.

Further, the vehicle control part 22 of the ECU 20 performs hazard avoidance control if it is judged that the driver is not in a condition able to drive. For example, the vehicle control part 22 controls the various types of actuators 40 of the vehicle 80 to take the vehicle 80 off the road. Specifically, the vehicle control part 22 gradually lowers the vehicle speed to bring the vehicle 80 to a stop at the roadside while turning on the hazard light of the vehicle 80. Further, if an automated driving system able to automatically control the operation of the vehicle 80 is not provided at the vehicle 80, as hazard avoidance control, for example, the hazard light is turned on.

Note that, the driver condition judging part 21 may emit an alarm to the driver when detecting that the driver has slumped against the steering wheel 82. In this case, the driver condition judging part 21 judges that the driver is not in a condition able to drive if detecting the driver slumping against the steering wheel 82 and the driver fails to respond to the alarm.

For example, the driver condition judging part 21 emits a visual or audio alarm to the driver through a human-machine interface (HMI) 50. The HMI 50 is an interface for input and output of information between the driver and the vehicle 80. The HMI 50 is, for example, comprised of a display for displaying text or image information, a speaker for generating sound, operating buttons for the driver to perform an input operation, a touch panel, microphone, etc.

Figure 4:
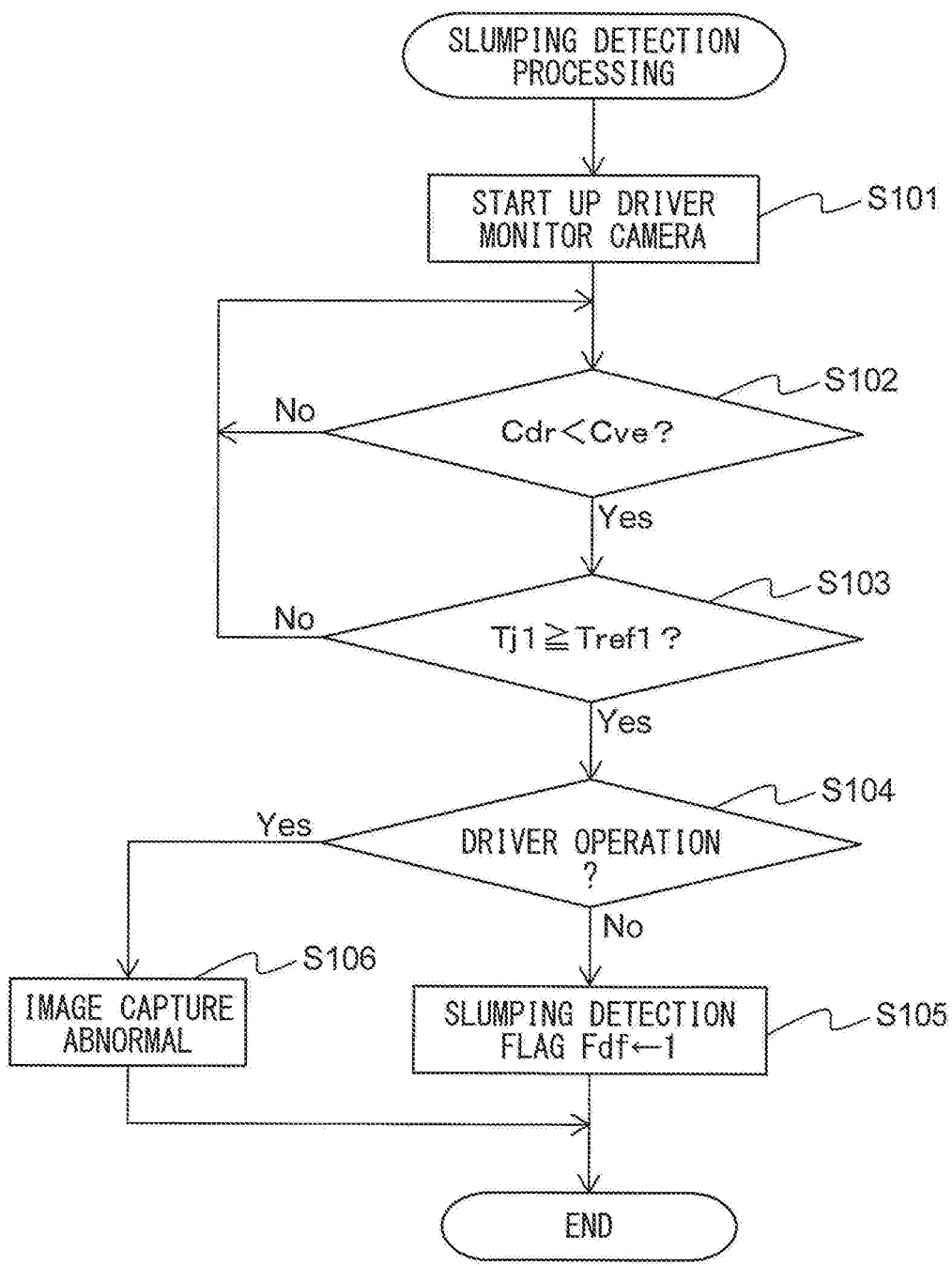
FIG. 4 is a flow chart showing a control routine of slumping detection processing in the first embodiment.

Below, referring to the flow charts of FIG. 4 and FIG. 5, the control for using the driver condition detection system 1 to detect the driver condition will be explained in detail. FIG. 4 is a flow chart showing the control routine of slumping detection processing in the first embodiment. The present control routine is performed at predetermined timing by the ECU 20. In the present control routine, the presence or absence of slumping of the driver against the steering wheel 82 is detected.

First, at step S101, the driver condition judging part 21 starts up the driver monitor camera 10. After that, the driver monitor camera 10 captures the driver of the vehicle 80 to generate an image of the driver at predetermined intervals, and the generated image of the driver is transmitted to the driver condition judging part 21.

Next, at step S102, the driver condition judging part 21 judges whether the contrast $C_{dr}$ of the image of the driver generated by the driver monitor camera 10 is lower than the contrast Cve of the image in the vehicle generated by the driver monitor camera when the driver is not in front of the driver monitor camera. The contrast Cve of the image in the vehicle is for example stored in advance in the ROM of the ECU 20.

For example, the driver condition judging part 21 judges that the contrast of the image of the driver is lower than the contrast of the image in the vehicle if the ratio of the area of the region where the luminance difference is a predetermined value or less is higher in the image of the driver than the image in the vehicle. Further, the driver condition judging part 21 may judge that the contrast of the image of the driver is lower than the contrast of the image in the vehicle if the difference of the maximum value and minimum value of the luminance is smaller in the image of the driver than the image in the vehicle.

If at step S102 it is judged that the contrast Cdr of the image of the driver is the contrast Cve of the image in the vehicle or more, step S102 is repeatedly performed. On the other hand, if at step S102 it is judged that the contrast Cdr of the image of the driver is lower than the contrast Cve of the image in the vehicle, the present control routine proceeds to step S103.

At step S103, the driver condition judging part 21 judges whether the first time Tj1 when the contrast Cdr of the image of the driver is judged to be lower than the contrast Cve of the image in the vehicle is the first reference time Tref1 or more. In other words, the driver condition judging part 21 judges whether the first time Tj1 when the state where the contrast Cdr of the image of the driver is lower than the contrast Cve of the image in the vehicle is maintained is the first reference time Tref1 or more. The first reference time Tref1 is set in advance and is, for example, 1 second to 5 seconds. If at step S103, it is judged that the first time Tj1 is less than the first reference time Tref1, the present control routine returns to step S102. On the other hand, if at step S103 it is judged that the first time Tj1 is the first reference time Tref1 or more, the present control routine proceeds to step S104.

At step S104, the driver condition judging part 21 judges whether there has been a driver operation. For example, the driver condition judging part 21 judges that there has been a driver operation if at least one of acceleration, steering, and braking of the vehicle 80 has been performed by the driver. On the other hand, the driver condition judging part 21 judges that there has been no driver operation if acceleration, steering, and braking of the vehicle 80 have not been performed by the driver. If at step S104 it is judged that there has been no driver operation, the present control routine proceeds to step S105.

In this case, it is presumed that the driver is slumping against the steering wheel 82. For this reason, at step S105, the driver condition judging part 21 sets the slumping detection flag Fdf to "1". That is, the driver condition judging part 21 detects slumping of the driver against the steering wheel 82. The initial value of the slumping detection flag Fdf is zero. After step S105, the present control routine is ended.

On the other hand, if at step S104 it is judged that there has been a driver operation, the present control routine proceeds to step S106. In this case, it is presumed that the driver monitor camera 10 is not functioning normally due to something in the light path. For this reason, at step S106, the driver condition judging part 21 judges that an abnormality has occurred in the image capturing operation of the driver monitor camera 10 and uses the HMI 50 etc., to convey the abnormality to the driver. After step S106, the present control routine is ended. Note that, step S104 and step S106 may be omitted.

Figure 5:
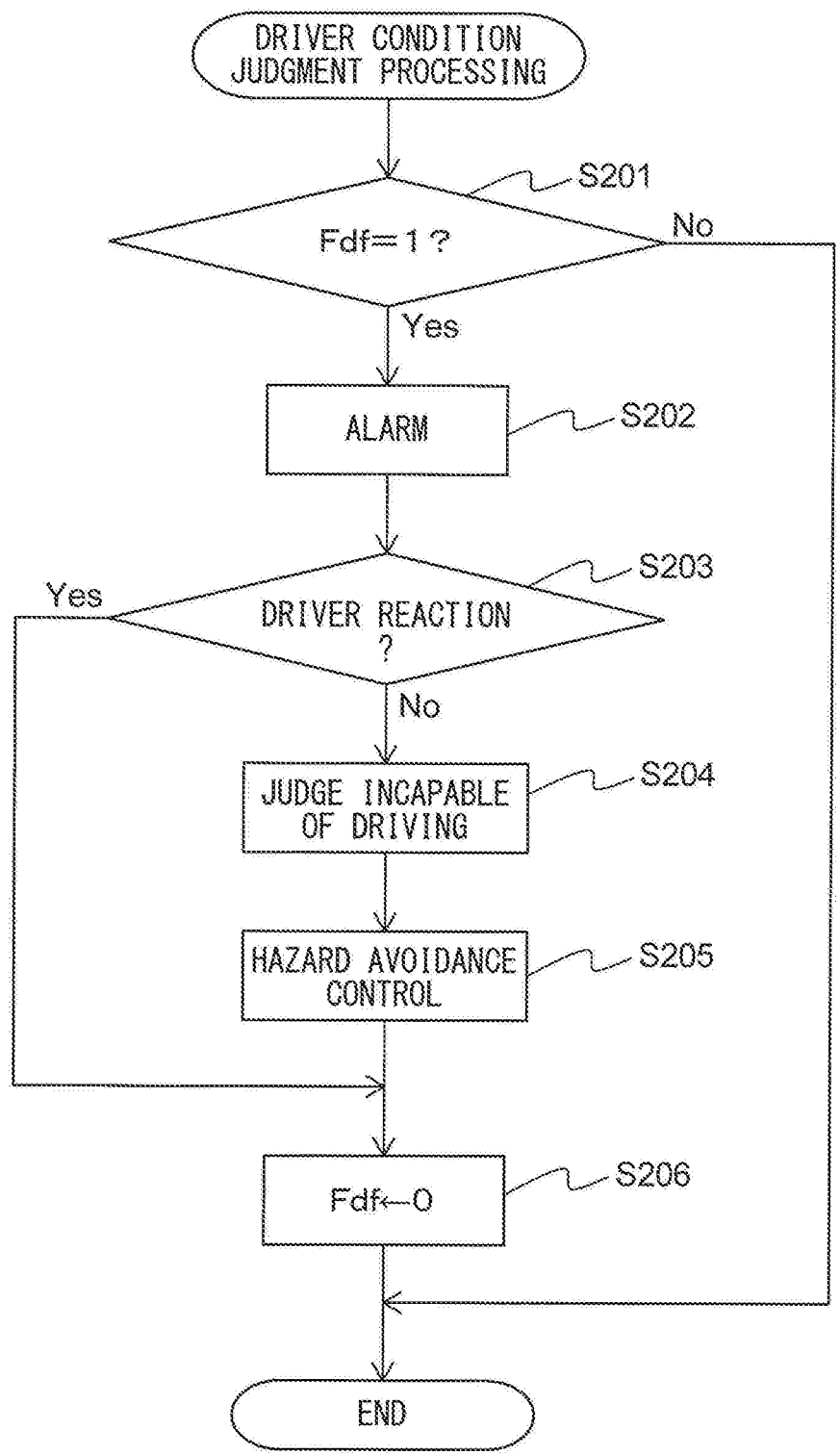
FIG. 5 is a flow chart showing a control routine of driver condition judgment processing in the first embodiment.

FIG. 5 is a flow chart showing a control routine of driver condition judgment processing in the first embodiment. The present control routine is performed repeatedly by the ECU 20 while the ignition switch of the vehicle 80 is turned on. In the present control routine, the driver condition is judged.

First, at step S201, the driver condition judging part 21 judges whether the slumping detection flag Fdf is "1". If it is judged that the slumping detection flag Fdf is "0", the present control routine is ended. On the other hand, if it is judged that the slumping detection flag Fdf is "1", that is, if slumping of the driver is detected, the present control routine proceeds to step S202.

At step S202, the driver condition judging part 21 emits an alarm to the driver. For example, the driver condition judging part 21 emits a visual or audio alarm to the driver through the HMI 50. The alarm time is for example 2 seconds to 10 seconds.

Next, at step S203, the driver condition judging part 21 judges whether there has been a reaction from the driver during the alarm. The "reaction of the driver" is a voice response, depression of a switch, driving operation, etc. If at step S203 it is judged that there has been no reaction of the driver during an alarm, the present control routine proceeds to step S204.

At step S204, the driver condition judging part 21 judges that the driver is not in a condition able to drive. Next, at step S205, the vehicle control part 22 performs hazard avoidance control. For example, the vehicle control part 22 controls the various types of actuators 40 of the vehicle 80 to take the vehicle 80 off the road.

Specifically, the vehicle control part 22 gradually lowers the vehicle speed to bring the vehicle 80 to a stop at the roadside while turning on the hazard light of the vehicle 80. Further, if an automated driving system able to automatically control the operation of the vehicle 80 is not provided at the vehicle 80, as hazard avoidance control, for example, the hazard light is turned on.

Next, at step S206, the driver condition judging part 21 resets the slumping detection flag Fdf to zero. After step S206, the present control routine is ended.

On the other hand, if it is judged at step S203 that there has been a driver response during the alarm, the present control routine proceeds to step S206. In this case, it is presumed that the driver's consciousness was recovered by the alarm or that slumping was mistakenly detected, and thus at step S206, the slumping detection flag Fdf is set to zero. After step S206, the present control routine is ended.

Note that, step S202 and step S203 may be omitted. Further, even if the fact that the driver is not in a condition able to drive is not clearly notified, if hazard avoidance control such as taking the vehicle 80 off the road is performed, it may substantially be said that it is judged that the driver is not in a condition able to drive.

Second Embodiment

The configuration and control of the driver condition detection system according to the second embodiment basically are similar to the configuration and control of the driver condition detection system according to the first embodiment except for the points explained below. For this reason, below, in the second embodiment of the present disclosure, primarily the parts different from the first embodiment will be explained.

The contrast of the image generated by the driver monitor camera 10 is affected by the luminance in the vehicle. Further, the luminance in the vehicle changes according to the weather, time, etc. Therefore, in the second embodiment, the driver condition judging part 21 updates the contrast of the image in the vehicle by capturing an image by the driver monitor camera 10 before starting detection of the driver slumping against the steering wheel 82. By doing this, regardless of the luminance in the vehicle, it is possible to identify a drop in the contrast of the image of the driver due to the driver slumping and in turn possible to more precisely detect driver slumping.

Figure 6:
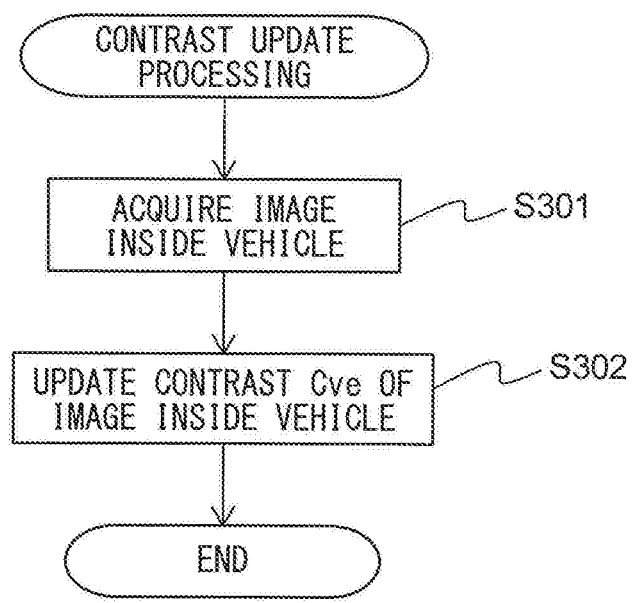
FIG. 6 is a flow chart showing a control routine of contrast update processing in a second embodiment.

FIG. 6 is a flow chart showing a control routine of contrast update processing in the second embodiment. The present control routine is performed by the ECU 20 before the driver sits in the driver's seat. For example, the present control routine is performed when the door of the vehicle 80 is unlocked. In the present control routine, the contrast of the image in the vehicle is updated.

First, at step S301, the driver condition judging part 21 acquires the image in the vehicle. Specifically, the driver condition judging part 21 starts up the driver monitor camera 10 and receives the image in the vehicle generated by the image capturing operation of the driver monitor camera 10 from the driver monitor camera 10. Next, at step S302, the driver condition judging part 21 updates the contrast Cve of the image in the vehicle. The updated contrast Cve of the image in the vehicle is for example stored in the RAM of the ECU 20. After step S302, the present control routine is ended.

In the second embodiment as well, in the same way as the first embodiment, the control routine of the slumping detection processing of FIG. 4 and the control routine of the driver condition judgment processing of FIG. 5 are performed. In the second embodiment, at step S102 of FIG. 4, as the contrast Cve of the image in the vehicle, the data updated at step S302 of FIG. 6 is used.

Third Embodiment

The configuration and control of the driver condition detection system according to the third embodiment basically are similar to the configuration and control of the driver condition detection system according to the first embodiment except for the points explained below. For this reason, below, in the third embodiment of the present disclosure, primarily the parts different from the first embodiment will be explained.

As explained above, when the driver is slumped against the steering wheel 82, the driver approaches the driver monitor camera 10, so the contrast of the image of the driver generated by the driver monitor camera 10 falls. As a result, at the image of the driver, the face of the driver cannot be detected. However, the face of the driver also cannot be detected when the driver is outside the range of capture of the driver monitor camera 10. On the other hand, when the driver is slumped against the steering wheel 82, sometimes the horn button of the steering wheel 82 is pressed by the driver.

Therefore, in the third embodiment, the driver condition judging part 21 detects the driver slumping against the steering wheel 82 when the face of the driver cannot be detected in the image of the driver generated by the driver monitor camera 10 and the horn button of the steering wheel 82 being pressed is detected. Due to this, it is possible to more easily detect the driver slumping against the steering wheel 82.

Figure 7:
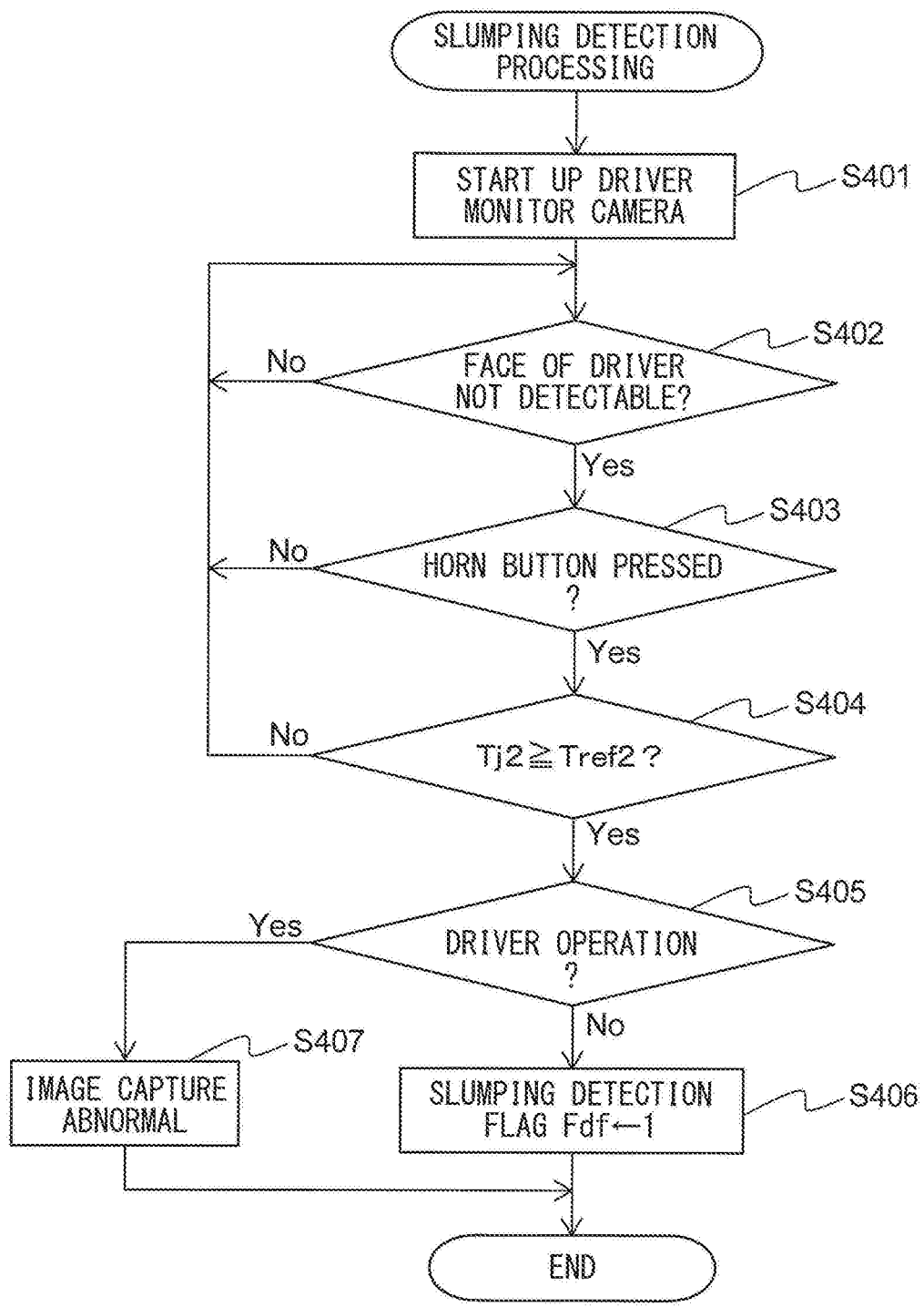
FIG. 7 is a flow chart showing a control routine of slumping detection processing in a third embodiment.

FIG. 7 is a flow chart showing a control routine of the slumping detection processing of the third embodiment. The present control routine is performed at a predetermined timing by the ECU 20. In the present control routine, the presence or absence of slumping of the driver against the steering wheel 82 is detected.

First, at step S401, the driver condition judging part 21 starts up the driver monitor camera 10. After that, the driver monitor camera 10 captures the driver of the vehicle 80 at predetermined intervals to generate an image of the driver, and the generated image of the driver is transmitted to the driver condition judging part 21.

Next, at step S402, the driver condition judging part 21 judges whether the face of the driver cannot be detected in the image of the driver generated by the driver monitor camera 10. For example, the driver condition judging part 21 judges that the face of the driver cannot be detected in the image of the driver when it was not possible to detect the eyes, nose, mouth, and other parts of the face from the image of the driver by image processing.

If at step S402 it is judged that the face of the driver can be detected in the image of the driver, step S402 is repeatedly performed. On the other hand, if at step S402 it is judged that the face of the driver cannot be detected in the image of the driver, the present control routine proceeds to step S403.

At step S403, the driver condition judging part 21 judges whether the horn button of the steering wheel 82 is being pressed. For example, the driver condition judging part 21 judges that the horn button of the steering wheel 82 is being pressed when detecting the sound of the horn. If at step S403 it is judged that the horn button of the steering wheel 82 is not being pressed, the present control routine returns to step S402. On the other hand, if at step S403 it is judged that the horn button of the steering wheel 82 is being pressed, the present control routine proceeds to step S404.

At step S404, the driver condition judging part 21 judges whether the second time Tj2 when the conditions of both step S402 and step S403 are satisfied is the second reference time Tref2 or more. In other words, the driver condition judging part 21 judges whether the second time Tj2 when the state where the face of the driver cannot be detected and the horn button is being pressed is maintained is the second reference time Tref2 or more. The second reference time Tref2 is set in advance and is, for example, 1 second to 5 seconds. If at step S404 it is judged that the second time Tj2 is less than the second reference time Tref2, the present control routine returns to step S402. On the other hand, if at step S404 it is judged that the second time Tj2 is the second reference time Tref2 or more, the present control routine proceeds to step S405.

At step S405, in the same way as step S104 of FIG. 4, the driver condition judging part 21 judges whether there has been a driver operation. If at step S405 it is judged that there has been no driver operation, the present control routine proceeds to step S406. At step S406, the driver condition judging part 21 sets the slumping detection flag Fdf to "1". The initial value of the flag Fdf is zero. After step S406, the present control routine is ended.

On the other hand, if at step S405 it is judged that there has been a driver operation, the present control routine proceeds to step S407. At step S407, the driver condition judging part 21 judges that there is an abnormality in the image capturing operation by the driver monitor camera 10 and uses the HMI 50 etc., to convey the abnormality to the driver. After step S407, the present control routine is ended. Note that, step S405 and step S407 may be omitted.

In the third embodiment as well, in the same way as the first embodiment, the control routine of the driver condition judgment processing of FIG. 5 is performed.

Fourth Embodiment

The configuration and control of the driver condition detection system according to the fourth embodiment basically are similar to the configuration and control of the driver condition detection system according to the first embodiment except for the points explained below. For this reason, below, in the fourth embodiment of the present disclosure, primarily the parts different from the first embodiment will be explained.

As explained above, when the driver has slumped against the steering wheel 82, the driver approaches the driver monitor camera 10, so the contrast of the image of the driver generated by the driver monitor camera 10 falls. As a result, in the image of the driver, the face of the driver cannot be detected. However, the face of the driver also cannot be detected when the driver is outside the range of capture of the driver monitor camera 10. On the other hand, when the driver is slumped against the steering wheel 82, the driver touches the steering wheel 82.

For this reason, in the fourth embodiment, the driver condition judging part 21 detects slumping of the driver against the steering wheel 82 if it cannot detect the face of the driver in the image of the driver generated by the driver monitor camera 10 and the driver touching the steering wheel 82 is detected. Due to this, it is possible to more simply detect slumping of the driver against the steering wheel 82.

Figure 8:
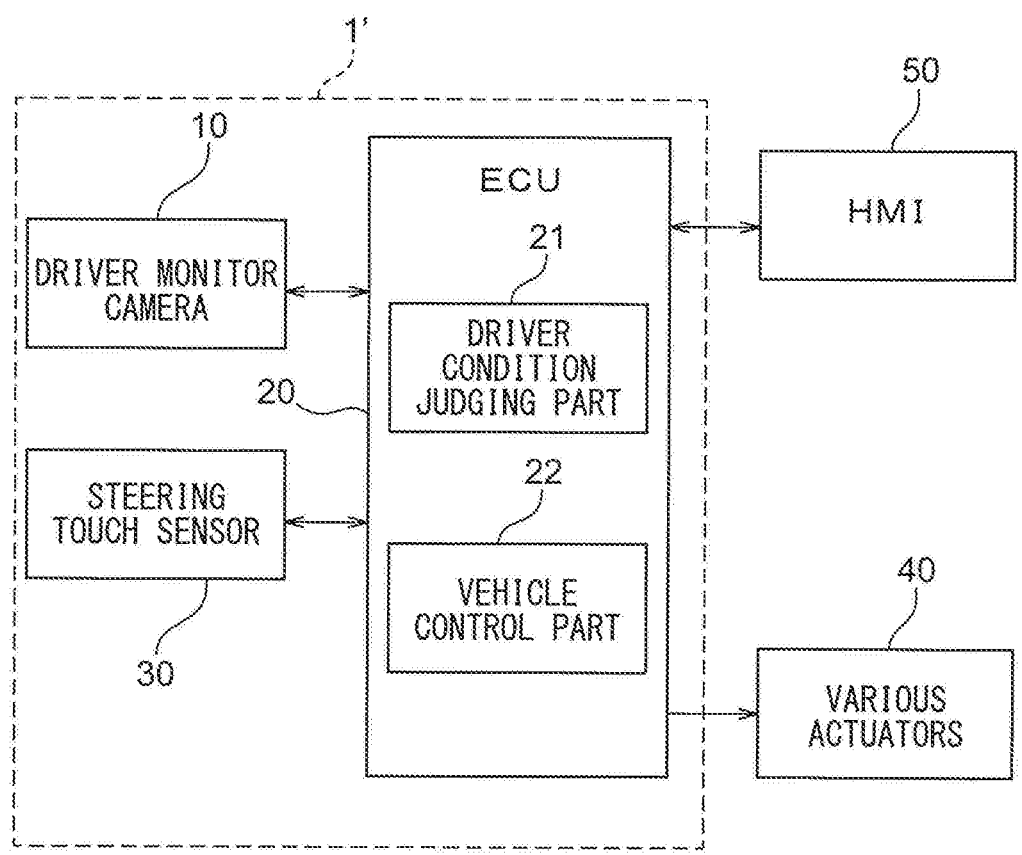
FIG. 8 is a block diagram showing the configuration of a driver condition detection system according to a fourth embodiment of the present disclosure.

The driver touching the steering wheel 82 is detected by the steering wheel touch sensor. FIG. 8 is a block diagram showing the configuration of a driver condition detection system according to a fourth embodiment of the present disclosure. The driver condition detection system 1' is provided with a driver monitor camera 10, electronic control unit (ECU) 20, and steering wheel touch sensor 30. The steering wheel touch sensor 30 detects whether the driver is touching the steering wheel 82. The steering wheel touch sensor 30 is provided at the steering wheel 82. The touch information of the steering wheel 82 detected by the steering wheel touch sensor 30 is transmitted to the ECU 20.

Figure 9:
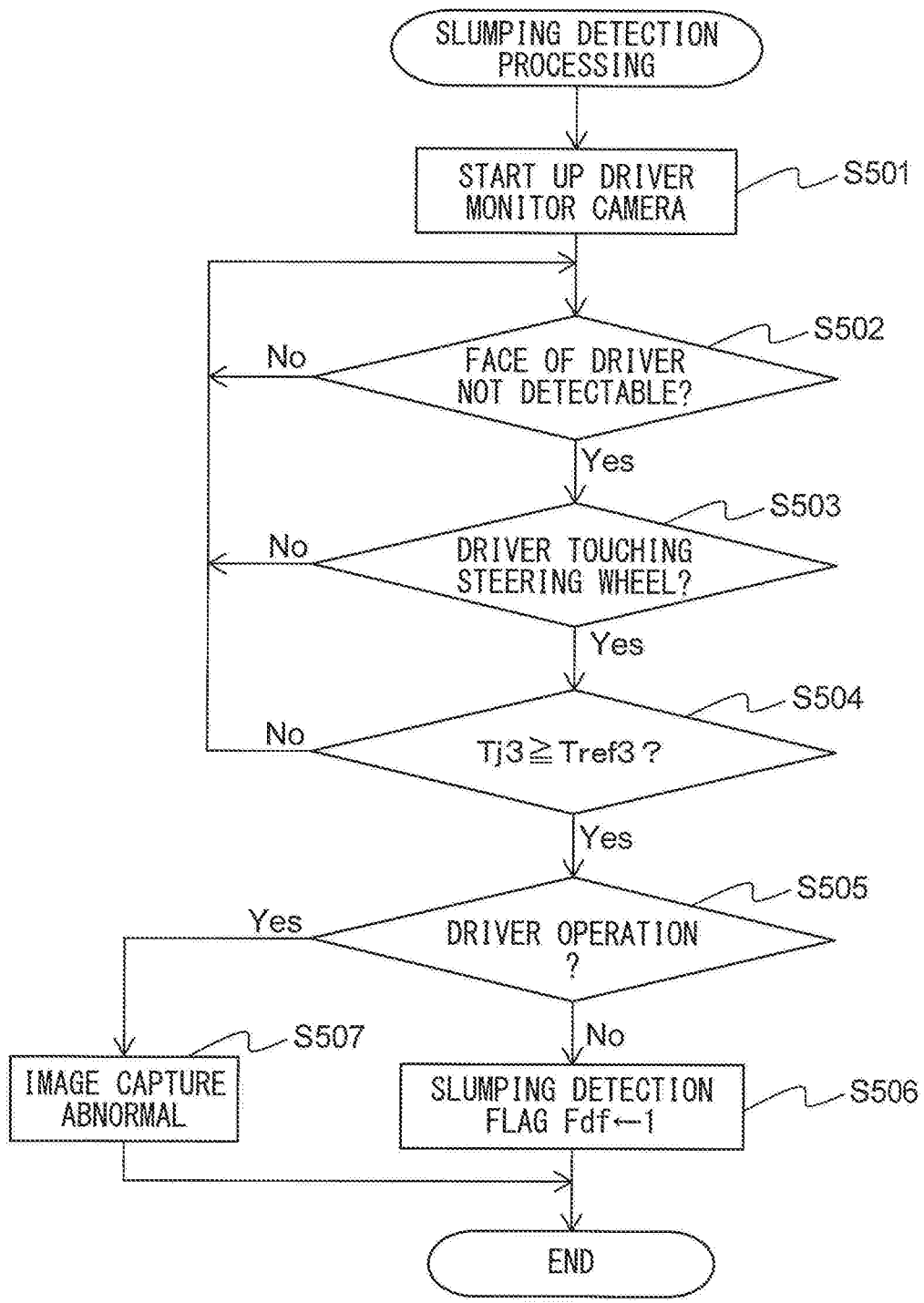
FIG. 9 is a flow chart showing a control routine of slumping detection processing in a fourth embodiment.

FIG. 9 is a flow chart showing the control routine of slumping detection processing in a fourth embodiment. The present control routine is performed at predetermined timings by the ECU 20. In the present control routine, the presence or absence of slumping of the driver against the steering wheel 82 is detected.

First, at step S501, the driver condition judging part 21 starts up the driver monitor camera 10. After that, the driver monitor camera 10 captures the driver of the vehicle 80 at predetermined intervals to generate an image of the driver, and the generated image of the driver is transmitted to the driver condition judging part 21.

Next, at step S502, in the same way as step S402 of FIG. 7, the driver condition judging part 21 judges whether the face of the driver cannot be detected in the image of the driver generated by the driver monitor camera 10.

If at step S502 it is judged that the face of the driver can be detected in the image of the driver, step S502 is repeatedly performed. On the other hand, if at step S502 it is judged that the face of the driver cannot be detected in the image of the driver, the present control routine proceeds to step S503.

At step S503, the driver condition judging part 21 judges whether the driver is touching the steering wheel 82. The driver touching the steering wheel 82 is detected by the steering wheel touch sensor 30. If at step S503 it is judged that the driver is not touching the steering wheel 82, the present control routine returns to step S502. On the other hand, if at step S503 it is judged that the driver is touching the steering wheel 82, the present control routine proceeds to step S504.

At step S504, the driver condition judging part 21 judges whether the third time Tj3 when the conditions of both step S502 and step S503 are satisfied is the third reference time Tref3 or more. In other words, the driver condition judging part 21 judges whether the third time Tj3 when the state where the face of the driver cannot be detected and the driver is touching the steering wheel 82 is being maintained is a third reference time Tref3 or more. The third reference time Tref3 is set in advance and is, for example, 1 second to 5 seconds. If at step S504 it is judged that the third time Tj3 is less than the third reference time Tref3, the present control routine returns to step S502. On the other hand, if at step S504 it is judged that the third time Tj3 is the third reference time Tref3 or more, the present control routine proceeds to step S505.

At step S505, in the same way as step S104 of FIG. 4 and step S405 of FIG. 7, the driver condition judging part 21 judges whether there has been a driver operation. If at step S505 it is judged that there has been no driver operation, the present control routine proceeds to step S506. At step S506, the driver condition judging part 21 sets the slumping detection flag Fdf to "1". The initial value of the flag Fdf is zero. After step S506, the present control routine is ended.

On the other hand, if at step S505 it is judged that there has been a driver operation, the present control routine proceeds to step S507. At step S507, the driver condition judging part 21 judges that there is an abnormality in the image capturing operation of the driver monitor camera 10 and uses the HMI 50 etc., to convey the abnormality to the driver. After step S507, the present control routine is ended. Note that, step S505 and step S507 may be omitted.

Above, embodiments were explained, but the present disclosure is not limited to these embodiments and may be corrected and changed in various ways within the scope of the claims. Further, the above embodiments may be worked in any combination.

The invention claimed is:

1. A driver condition detection system comprising:
   a driver monitor camera provided in a vehicle and capturing a driver of the vehicle to generate an image of the driver, and
   a driver condition judging part configured to judge a condition of the driver based on the image of the driver, wherein
   the driver condition judging part is configured to judge that the driver is not in a condition able to drive if detecting the driver slumping against the steering wheel based on the image of the driver.

2. The driver condition detection system according to claim 1, wherein the driver condition judging part is configured to detect slumping against the steering wheel if a contrast of the image of the driver is lower than a contrast of an image in the vehicle generated by the driver monitor camera when the driver is not in front of the driver monitor camera.

3. The driver condition detection system according to claim 2, wherein the driver condition judging part is configured to update the contrast of the image in the vehicle by an image capturing operation of the driver monitor camera before starting the detection of slumping.

4. The driver condition detection system according to claim 2, wherein the driver condition judging part is configured to judge that the contrast of the image of the driver is lower than the contrast of the image in the vehicle if a ratio of an area of a region where a luminance difference is a predetermined value or less is higher in the image of the driver than the image in the vehicle.

5. The driver condition detection system according to claim 3, wherein the driver condition judging part is configured to judge that the contrast of the image of the driver is lower than the contrast of the image in the vehicle if a ratio of an area of a region where a luminance difference is a predetermined value or less is higher in the image of the driver than the image in the vehicle.

6. The driver condition detection system according to claim 1, wherein the driver condition judging part is configured to detect slumping against the steering wheel if it cannot detect a face of the driver in the image of the driver and detects a horn button of the steering wheel being pressed.

7. The driver condition detection system according to claim 2, wherein the driver condition judging part is configured to detect slumping against the steering wheel if it cannot detect a face of the driver in the image of the driver and detects a horn button of the steering wheel being pressed.

8. The driver condition detection system according to claim 3, wherein the driver condition judging part is configured to detect slumping against the steering wheel if it cannot detect a face of the driver in the image of the driver and detects a horn button of the steering wheel being pressed.

9. The driver condition detection system according to claim 4, wherein the driver condition judging part is configured to detect slumping against the steering wheel if it cannot detect a face of the driver in the image of the driver and detects a horn button of the steering wheel being pressed.

10. The driver condition detection system according to claim 1, further comprising a steering wheel touch sensor detecting the driver touching the steering wheel, wherein
the driver condition judging part is configured to detect slumping against the steering wheel if it cannot detect a face of the driver in the image of the driver and the steering wheel touch sensor detects the steering wheel being touched.

11. The driver condition detection system according to claim 2, further comprising a steering wheel touch sensor detecting the driver touching the steering wheel, wherein
the driver condition judging part is configured to detect slumping against the steering wheel if it cannot detect a face of the driver in the image of the driver and the steering wheel touch sensor detects the steering wheel being touched.

12. The driver condition detection system according to claim 3, further comprising a steering wheel touch sensor detecting the driver touching the steering wheel, wherein
the driver condition judging part is configured to detect slumping against the steering wheel if it cannot detect a face of the driver in the image of the driver and the steering wheel touch sensor detects the steering wheel being touched.

13. The driver condition detection system according to claim 4, further comprising a steering wheel touch sensor detecting the driver touching the steering wheel, wherein
the driver condition judging part is configured to detect slumping against the steering wheel if it cannot detect a face of the driver in the image of the driver and the steering wheel touch sensor detects the steering wheel being touched.

14. The driver condition detection system according to claim 5, further comprising a steering wheel touch sensor detecting the driver touching the steering wheel, wherein
the driver condition judging part is configured to detect slumping against the steering wheel if it cannot detect a face of the driver in the image of the driver and the steering wheel touch sensor detects the steering wheel being touched.

15. The driver condition detection system according to claim 6, further comprising a steering wheel touch sensor detecting the driver touching the steering wheel, wherein
the driver condition judging part is configured to detect slumping against the steering wheel if it cannot detect a face of the driver in the image of the driver and the steering wheel touch sensor detects the steering wheel being touched.

16. The driver condition detection system according to claim 7, further comprising a steering wheel touch sensor detecting the driver touching the steering wheel, wherein
the driver condition judging part is configured to detect slumping against the steering wheel if it cannot detect a face of the driver in the image of the driver and the steering wheel touch sensor detects the steering wheel being touched.

17. The driver condition detection system according to claim 8, further comprising a steering wheel touch sensor detecting the driver touching the steering wheel, wherein
the driver condition judging part is configured to detect slumping against the steering wheel if it cannot detect a face of the driver in the image of the driver and the steering wheel touch sensor detects the steering wheel being touched.

18. The driver condition detection system according to claim 9, further comprising a steering wheel touch sensor detecting the driver touching the steering wheel, wherein
the driver condition judging part is configured to detect slumping against the steering wheel if it cannot detect a face of the driver in the image of the driver and the steering wheel touch sensor detects the steering wheel being touched.

* * * * *